US011255311B2

(12) United States Patent
Li et al.

(10) Patent No.: US 11,255,311 B2
(45) Date of Patent: Feb. 22, 2022

(54) ROTOR ROTATION CONTROL SYSTEM AND CONTROL METHOD FOR WIND TURBINE

(71) Applicant: JIANGSU GOLDWIND SCIENCE & TECHNOLOGY CO., LTD., Jiangsu (CN)

(72) Inventors: Hongfeng Li, Jiangsu (CN); Yong Yang, Jiangsu (CN); Jing Fang, Jiangsu (CN); Endi Zhai, Jiangsu (CN); Xingang Zhang, Jiangsu (CN); Ye Li, Jiangsu (CN)

(73) Assignee: JIANGSU GOLDWIND SCIENCE & TECHNOLOGY CO., LTD., Jiangsu (CN)

( * ) Notice: Subject to any disclaimer, the term of this patent is extended or adjusted under 35 U.S.C. 154(b) by 45 days.

(21) Appl. No.: 16/470,889

(22) PCT Filed: Apr. 8, 2018

(86) PCT No.: PCT/CN2018/082154
§ 371 (c)(1),
(2) Date: Jun. 18, 2019

(87) PCT Pub. No.: WO2019/127970
PCT Pub. Date: Jul. 4, 2019

(65) Prior Publication Data

US 2021/0079889 A1 Mar. 18, 2021

(30) Foreign Application Priority Data

Dec. 28, 2017 (CN) ......................... 201711457856.1

(51) Int. Cl.
*F03D 7/02* (2006.01)
*F03D 17/00* (2016.01)
(Continued)

(52) U.S. Cl.
CPC ......... *F03D 7/0296* (2013.01); *F03D 1/0658* (2013.01); *F03D 7/042* (2013.01);
(Continued)

(58) Field of Classification Search
None
See application file for complete search history.

(56) References Cited

U.S. PATENT DOCUMENTS 9,464,625 B2 * 10/2016 Brenner .................. F03D 80/00
10,502,186 B2 * 12/2019 Kruger .................. F03D 7/0224
(Continued)

FOREIGN PATENT DOCUMENTS

CN 101092931 A 12/2007
CN 105089945 A 11/2015
(Continued)

OTHER PUBLICATIONS

The International Search Report dated Sep. 28, 2018; PCT/CN2018/082154.

(Continued)

*Primary Examiner* — Ninh H. Nguyen
*Assistant Examiner* — Jason Fountain

(57) ABSTRACT

A rotor rotation control system for a wind turbine and a control method thereof are provided. The control system includes a rotation unit configured to drive a rotor of the wind turbine to rotate relative to an engine base of the wind turbine, a driving unit configured to drive the rotation unit, and a processor configured to determine a bending moment load switching position on a rotating shaft of the rotor, and output an adjustment instruction to the driving unit based on the bending moment load switching position.

22 Claims, 9 Drawing Sheets

(51) Int. Cl.

| | |
|---|---|
| ***F03D 7/04*** | (2006.01) |
| ***F03D 13/10*** | (2016.01) |
| ***F03D 1/06*** | (2006.01) |

(52) U.S. Cl.

CPC ............. *F03D 13/10* (2016.05); *F03D 17/00* (2016.05); *F05B 2240/21* (2013.01); *F05B 2260/31* (2020.08); *F05B 2260/70* (2013.01); *F05B 2270/80* (2013.01)

(56) References Cited

U.S. PATENT DOCUMENTS

| | | | | |
|---|---|---|---|---|
| 10,662,927 | B2 * | 5/2020 | Zhang | F03D 1/0608 |
| 2007/0294049 | A1 | 12/2007 | Pierce et al. | |
| 2010/0004878 | A1 * | 1/2010 | Volanthen | F03D 17/00 702/42 |
| 2011/0135481 | A1 | 6/2011 | Koronkiewicz | |
| 2014/0110949 | A1 * | 4/2014 | Brenner | H02K 7/1838 290/55 |
| 2014/0127028 | A1 | 5/2014 | Feigl et al. | |
| 2014/0377062 | A1 * | 12/2014 | Jakobsen | F03D 80/50 416/1 |
| 2016/0252075 | A1 * | 9/2016 | Kruger | F03D 7/0292 416/1 |
| 2016/0298603 | A1 | 10/2016 | Guern et al. | |
| 2017/0233228 | A1 | 8/2017 | Coners et al. | |
| 2019/0072077 | A1 * | 3/2019 | Zhang | F03D 80/50 |

FOREIGN PATENT DOCUMENTS

| | | | |
|---|---|---|---|
| CN | 106438197 | A | 2/2017 |
| CN | 106573764 | A | 4/2017 |
| CN | 106677993 | A | 5/2017 |
| CN | 106762438 | A | 5/2017 |
| CN | 206555073 | U | 10/2017 |
| EP | 2415665 | A3 | 2/2012 |
| EP | 2554834 | A1 | 6/2013 |
| WO | 01/94779 | A1 | 12/2001 |
| WO | 2015/071689 | A1 | 5/2015 |

OTHER PUBLICATIONS

Extended European Search Report dated Nov. 13, 2019; Appln. No. 18884852.7.

The First Chinese Office Action dated Oct. 28, 2019; Appln. No. 2017111457856.1.

* cited by examiner

ROTOR ROTATION CONTROL SYSTEM AND CONTROL METHOD FOR WIND TURBINE

CROSS REFERENCE TO RELATED APPLICATIONS

This application is the national phase of International Application No. PCT/CN2018/082154, filed on Apr. 8, 2018, which claims the benefit of priority to Chinese Patent Application No. 201711457856.1, titled "ROTOR ROTATION CONTROL SYSTEM AND CONTROL METHOD FOR WIND TURBINE", filed on Dec. 28, 2017 with the Chinese Patent office, which is incorporated herein by reference in its entirety.

FIELD

The present disclosure relates to the technical field of wind power generation, and in particular to a rotor rotation control system for a wind turbine and a control method thereof.

BACKGROUND

A wind turbine is an electrical device which converts wind energy into mechanical energy and then converts the mechanical energy into electrical energy. The wind turbine includes such main parts as an engine room, a generator and blades. The generator includes a rotor and a stator, a wheel hub is provided on a main shaft of the rotor and at least one blade is installed on the wheel hub of the rotor. When the wind turbine is working, the blade can drive the wheel hub to rotate under the action of the wind, and further drive the rotor of the generator to rotate, generating electrical energy as rotor windings of the generator cut magnetic induction lines.

With the development of large wind turbine, the blade installation of wind turbine becomes more and more difficult, where usually, the blades need to be installed separately. The number of blades of a wind turbine is generally more than one, preferably three in general. In the process of installing multiple blades separately, it is necessary to adjust the position of the wheel hub of the wind turbine to meet the installation requirements of different blades. For example, after one blade is installed, it is necessary to rotate the wheel hub by an angle from the current position to another position for installing another blade. In addition, when the blade is being maintained, it is also necessary to rotate the wheel hub by an appropriate angle to adjust the blade to an appropriate position for easy maintenance. At present, the adjustment of the blade position is mainly implemented with a rotor rotating device in the wind turbine. The rotor rotating device can drive the rotor to rotate relative to the stator, and thereby drive the wheel hub connected with the rotor to rotate, to realize the adjustment of blade position.

In the process of installing multiple blades, the blades need to be rotated to different positions. During the rotating process, the gravity of the blade itself can lead to a sharp change in the direction of bending moment load, which causes a severe vibration to the wind turbine. Therefore, a rotor rotation control system and a control method thereof are urgently needed, to make transition of the bending moment load of the blades smooth during the process of blade installation or adjustment, without causing any severe vibration to the wind turbine.

SUMMARY

The technical problem to be solved by the invention is to overcome the disadvantage of the conventional technology by providing a rotor rotation control system for a wind turbine and a control method thereof, which can effectively avoid vibration in the process of installing and maintaining components of the wind turbine.

A rotor rotation control system for a wind turbine is provided according to the present disclosure. The rotor rotation control system includes a rotation unit configured to drive a rotor of the wind turbine to rotate relative to an engine base of the wind turbine, a driving unit configured to drive the rotation unit, and a processor configured to determine a bending moment load switching position on a rotating shaft of the rotor, and output an adjustment instruction to the driving unit based on the bending moment load switching position. The driving unit receives the adjustment instruction from the processor and adjusts an operation state of the rotation unit in response to the adjustment instruction, to balance change of the bending moment load at the bending moment load switching position.

A rotor rotation control method for a wind turbine is further provided according to the present disclosure. The rotor rotation control method includes: a driving step of driving a rotation unit, to drive a rotor connected with the rotation unit to rotate relative to an engine base of the wind turbine; and an adjustment step of determining a bending moment load switching position on a rotating shaft of the rotor, and adjusting an operation state of the rotation unit based on the bending moment load switching position to balance a bending moment load change at the bending moment load switching position.

A computer-readable storage medium is provided according to another aspect of the present disclosure, which is configured to store a computer program. When being run by a processor, the computer program performs the above-described rotor rotation control method for a wind turbine.

A computer is further provided according to another aspect of the present disclosure, which includes a memory, configured to store instructions, and a processor, configured to execute the instructions stored in the memory to perform the above-described rotor rotation control method for a wind turbine.

The rotor rotation control system for a wind turbine and the control method thereof according to the present disclosure can not only control the rotor rotation of the wind turbine, but also balance the load change during the rotating process, and can smooth transition of the load caused by the blade or other components to the wind turbine, effectively avoiding the severe vibration of the wind turbine and thereby reducing the damage to the components of the wind turbine.

Some additional aspects and/or advantages of the general idea of the present disclosure are described in the following descriptions, and the other can be clear through the description, or can be known through the implementation of the general idea of the present disclosure.

DETAILED DESCRIPTION OF EMBODIMENTS

In order that the above purposes, features and advantages of the present disclosure can be clearly understood, the invention is described below in detail with reference to the accompanying drawings and specific embodiments.

A wind turbine is a power device widely used in the field of wind power generation. The wind turbine includes parts such as an engine room, a generator and a blade. The generator includes a rotor and a stator, a rotating shaft of the rotor is connected with a wheel hub, and at least one blade is installed on the wheel hub, for example but not limited to, three blades are installed along a circumferential direction of the wheel hub. Depending on the arrangement of the rotor and the stator, the wind turbine generally includes two types, rotor-inside-stator wind turbine and stator-inside-rotor wind turbine. The invention is described taking a stator-inside-rotor wind turbine for example in the present disclosure. In fact, the present disclosure is not only limited to stator-inside-rotor wind turbines, but also applies to other types of wind turbine or other similar mechanical devices.

According to an embodiment of the present disclosure, in a stator-inside-rotor wind turbine, permanent magnets are arranged along a circumferential direction on an inner wall of the rotor, windings are arranged on an outer wall of the stator, and the stator is wholly installed inside the rotor. The stator is fixedly connected to the upper end of a tower of the wind turbine through a stator bracket. An engine room is installed at the upper end of the tower, and connected, rotatable along a circumferential direction, to the tower. For example, the engine room and the tower can be rotatably connected by bearings. Part of the upper end of the tower extends to the inside of the engine room.

A rotor rotation control system for a wind turbine is provided according to the present disclosure, which is capable of controlling rotation of a rotor based on a load change associated with the rotor. For example, the rotor rotation control system is configured to control the rotor rotating and smooth transition of load when multiple blades of the wind turbine are being installed, removed or maintained. The invention is described taking installing three blades on a wheel hub of a wind turbine for example, and in practice, the technical solutions according to the present disclosure also apply to other implementations of controlling rotor rotation.

Figure 1:
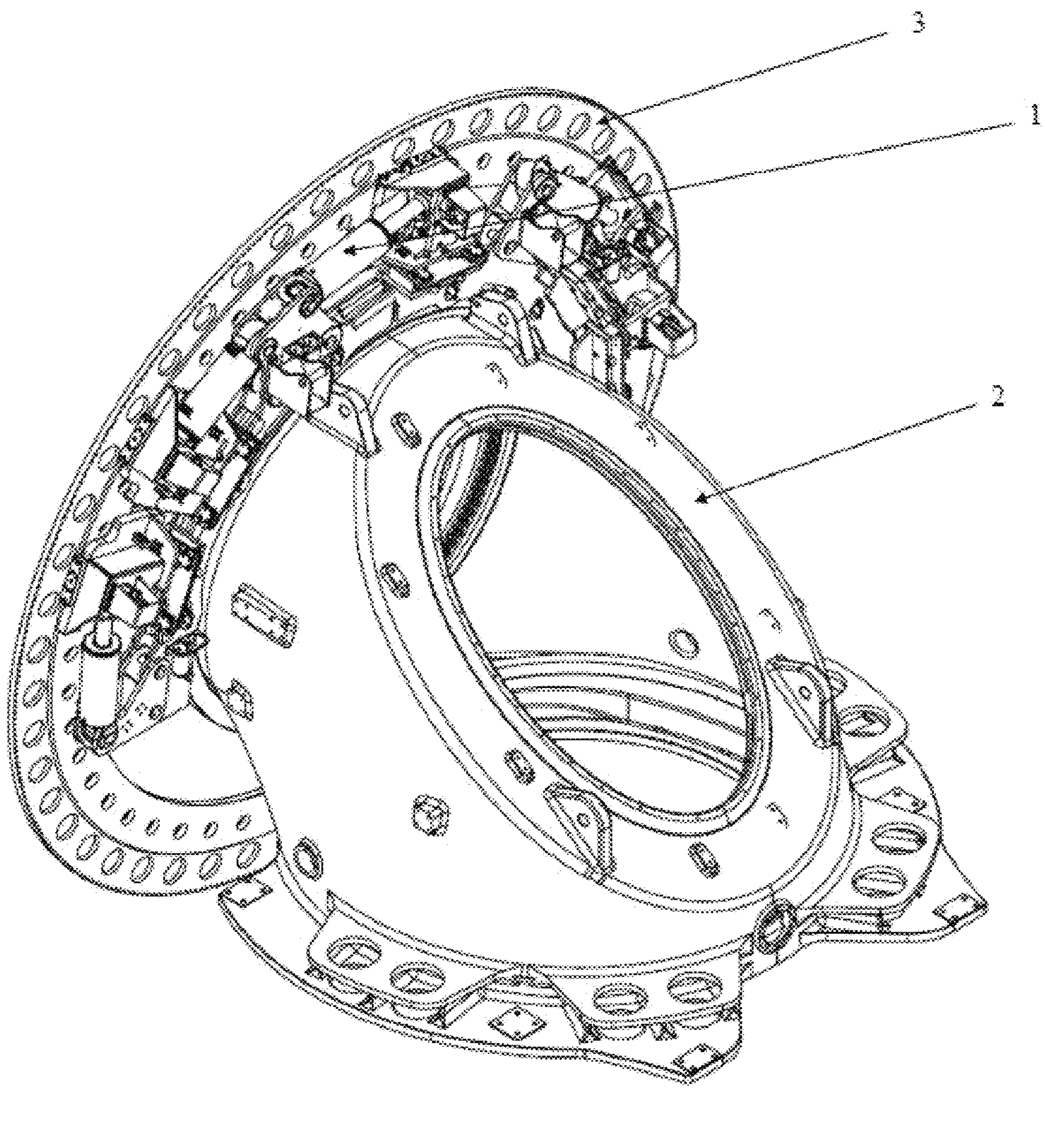
FIG. 1 is a partial schematic structural diagram of a rotor rotation control system applied to a wind turbine according to an embodiment of the present disclosure.
Figure 2:
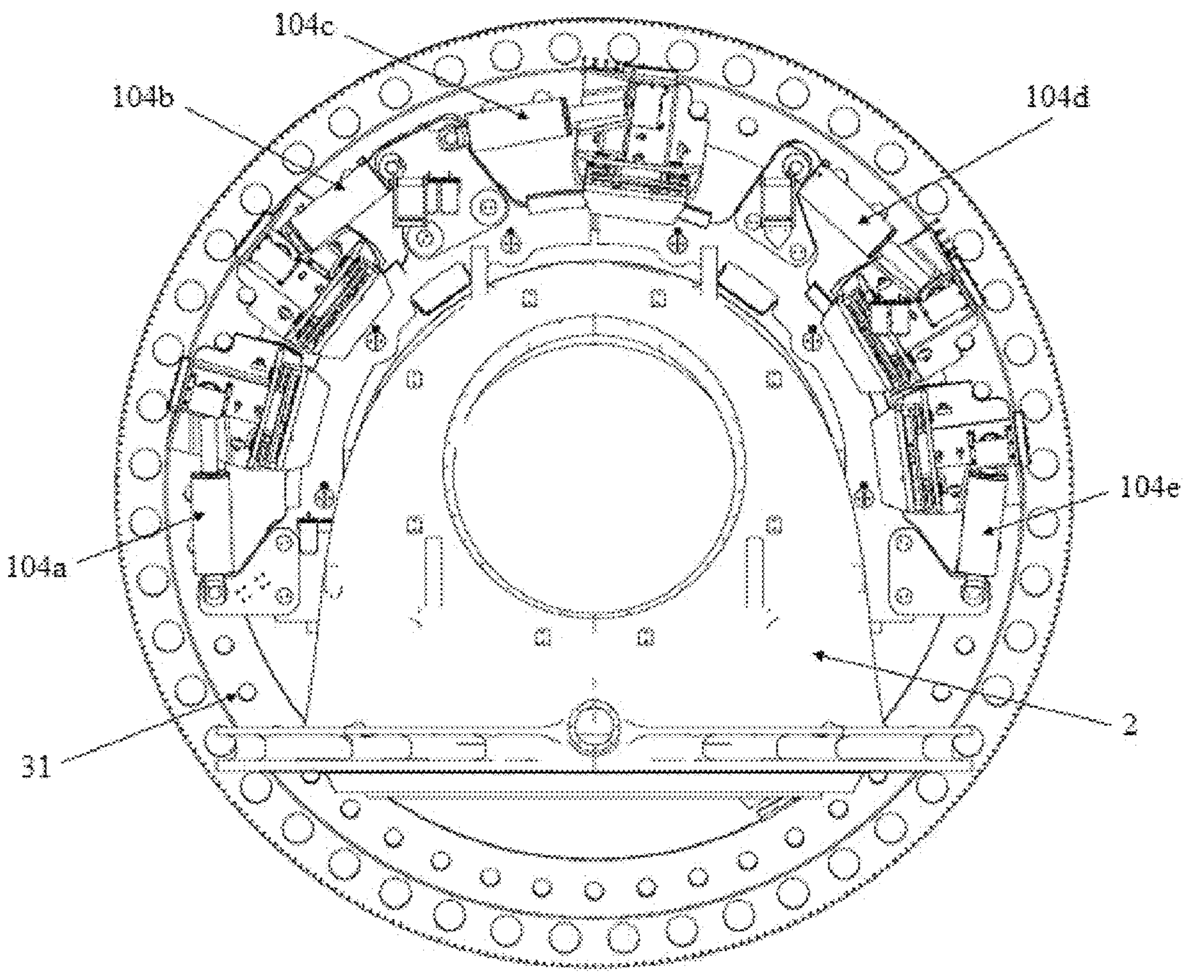
FIG. 2 is another partial schematic structural diagram of the rotor rotation control system applied to a wind turbine according to an embodiment of the present disclosure.

FIG. 1 and FIG. 2 show partial schematic structural diagrams of a rotor rotation control system 1 applied to a wind turbine according to an embodiment of the present disclosure. For sake of simplicity, only some components connected with the rotor control system are shown herein.

As shown in FIG. 1 and FIG. 2, the rotor rotation control system 1 is fixedly installed on an engine base 2 of the wind turbine. A generator end cover 3 of the wind turbine is fixedly connected to a rotor (not shown) of the generator. Multiple dowel holes 31 are provided on a side wall of the generator end cover 3 facing the engine base 2, and the spacing between adjacent dowel holes 31 can be set appropriately depending on practical application environments.

The rotor rotation control system 1 shown herein includes five rotation units, namely, a first rotation unit **104*a*, a second rotation unit 104*b*, a third rotation unit 104*c*, a fourth rotation unit 104*d* and a fifth rotation unit 104*e*. The rotation unit is configured to drive the rotor to rotate relative to the engine base 2. The five rotation units are evenly arranged on the engine base 2 along a circumferential direction of the engine base 2**. Other number of rotation units may be selected and arranged appropriately, depending on practical requirements of driving force and limitations of installation space.

Each rotation unit shown herein may include a telescoping cylinder, an installation base and a dowel. The telescoping cylinder may be a hydraulic cylinder, an air cylinder and a combination of a hydraulic cylinder and a cylinder, or other types of telescoping cylinder. In the illustrated embodiment, the telescoping cylinder is preferably a hydraulic cylinder. The installation base is detachably connected with the engine base 2, and a fixed end of the telescoping cylinder is connected with the engine base 2 through the installation base. The dowel is arranged at a movable end of the telescoping cylinder. Taking the third rotation unit **104*c* in FIG. 2 for example, the left side of the third rotation unit 104*c* is the fixed end and the right side is the moveable end. The structure of other rotation units is similar to that of the third rotation unit 104*c***.

The dowel is loosely fixed on the generator end cover 3. The dowel can elongate or shorten when driven by a hydraulic or pneumatic pressure. The dowel can be inserted into the dowel hole 31 to lock the dowel at the time of elongation, and removed from the dowel hole 31 at the time of shortening to unlock the dowel.

As shown in FIG. 2, according to the orientation (clockwise and counterclockwise) of the telescoping cylinder of each rotation unit along the circumferential direction of the engine base 2, orientations of the first rotation unit **104*a*, the third rotation unit 104*c* and the fourth rotation unit 104*d* are in one direction, and orientations of the second rotation unit 104*b* and the fifth rotation unit 104*e* are in another direction. Specifically, the first rotation unit 104*a*, the third rotation unit 104*c* and the fourth rotation unit 104*d* may elongate clockwise or contract counterclockwise, and the second rotation unit 104***b* and the fifth rotation unit 104*e* may contract clockwise or elongate counterclockwise. It should be noted that the elongation and contraction of the rotation unit described in the application respectively represent the elongation and contraction of the telescoping cylinder of the rotation unit.

The first rotation unit 104*a*, the second rotation unit 104*b*, the third rotation unit 104*c*, the fourth rotation unit 104*d* and the fifth rotation unit 104*e* jointly drive the rotor to rotate relative to the engine base 2 through stroke movement of their respective telescoping cylinders. In the embodiment shown, each rotation unit performs driving with a telescoping cylinder. In practice, the present disclosure is not limited to this, and actually the rotation unit can also be implemented with the combination of gear, rack, sprocket and chain to drive the rotor to rotate relative to the engine base 2.

The present disclosure is described taking driving the rotor to rotate clockwise relative to the engine base 2 for example. With no external force driving the rotor to rotate, when the rotor rotation control system 1 drives the rotor to rotate clockwise, the dowels of the five rotation units are all locked in the corresponding dowel holes, the first rotation unit 104*a*, the third rotation unit 104*c* and the fourth rotation unit 104*d* gradually elongate, that is, turning from a contraction state to an elongation state to apply clockwise thrust on the rotor, and the second rotation unit 104*b* and the fifth rotation unit 104*e* gradually contract, that is, turning from an elongation state to a contraction state to apply clockwise pull on the rotor. Thus, the five rotation units jointly drive the rotor to rotate clockwise. In the present disclosure, a stroke is defined as an elongation movement or a contraction movement completed by a telescoping cylinder of a rotation unit. In the illustrated embodiment, the five rotation units drive the rotor to rotate by roughly 7.5 degrees for each stroke.

When the rotor rotation control 1 system is applied to the blade installation or maintenance, the rotor is driven to rotate relative to the engine base 2 by the first rotation unit 104*a*, the second rotation unit 104*b*, the third rotation unit 104*c*, the fourth rotation unit 104*d* and the fifth rotation unit 104*e* together, then the rotor can drive the wheel hub fixed on the rotating shaft of the rotor to rotate, and eventually the wheel hub rotates to a position suitable for the blade installation and maintenance.

As shown in FIG. 2, the engine base 2 is fixed in a horizontal position. In the embodiment of the present disclosure, three blades of identical specifications can be horizontally installed in sequence on the wheel hub of the wind turbine by using the rotor rotation control system 1.

Figure 3:
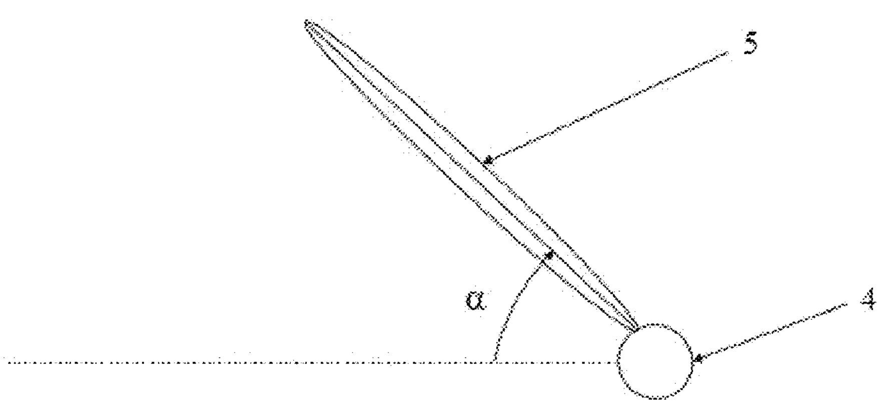
FIG. 3 is a schematic diagram of an angular position of a blade according to an embodiment of the present disclosure.
Figure 4:
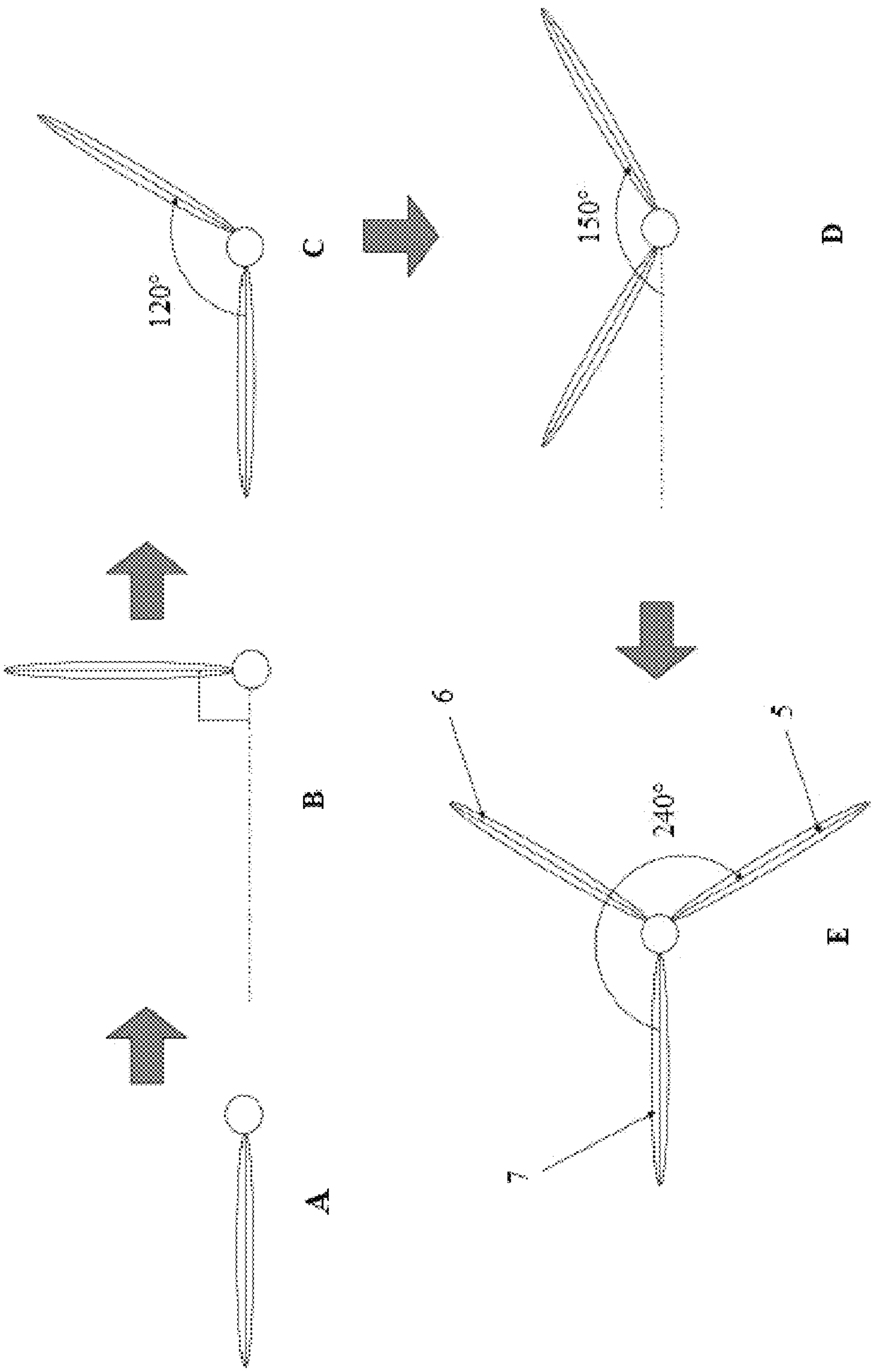
FIG. 4 is a schematic state diagram of sequential installation of a first blade, a second blade and a third blade according to an embodiment of the present disclosure.

The process of installing the first blade 5, the second blade 6 and the third blade 7 on the wheel hub in sequence is described with reference to the FIG. 3 and FIG. 4. FIG. 3 is a schematic diagram of an angular position of a blade according to an embodiment of the present disclosure. FIG. 4 is a state schematic diagram of the sequential installation of the first blade 5, the second blade 6 and the third blade 7 according to an embodiment of the present disclosure.

For ease of illustration, a deflection angle between the first blade 5 and a horizontal installation position is denoted as a, as shown in FIG. 3.

As shown in FIG. 4, an interface for installing the first blade 5 is rotated to the horizontal position by the rotor rotation control system of the present disclosure, that is, to state A ($\alpha$=0 degree), and at this point the wheel hub 4 is locked so as to install the first blade 5 on the wheel hub 4.

In order to rotate an interface for installing the second blade 6 to the horizontal position, the rotor rotation control system needs to drive the wheel hub 4 to rotate clockwise by 120 degrees, to reach state C. During the transition from state A to state C, state B where the first blade 5 rotates clockwise to a position of $\alpha$=90 degrees is ineluctable. Thereafter, a direction of a bending moment load which the gravity of the first blade 5 exerts on the wheel hub 4 changes sharply from left to right. At this point, a severe vibration may easily occur, causing damage to the components of the wind turbine. For example, because there is a gap between the dowel of the rotation unit and the dowel hole on the generator end cover, the dowel is liable to bounce in the dowel hole when the load changes sharply.

When the first blade 5 rotates clockwise to a position of $\alpha$=120 degrees to state C, the interface for installing the second blade 6 is just in the horizontal position, and wheel hub 4 is locked so as to install the second blade 6 on the wheel hub 4. Thereafter, because the gravity of the second blade 6 also causes a certain bending moment load on the wheel hub 4, a direction of the total bending moment load generated by the first blade 5 and the second blade 6 on the wheel hub 4 will sharply change again from right to left. At this point, a severe vibration may easily occur, thereby causing damage to the components of the wind turbine.

In order to rotate an interface for installing the third blade 7 to the horizontal position, the rotor rotation control system needs to drive the wheel hub 4 to further rotate clockwise by 120 degrees to reach state E ($\alpha$=240 degrees). During the transition from state C to state E, state D where the first blade 5 rotates clockwise to a position of $\alpha$=150 degrees is ineluctable. In state D, the first blade 5 and the second blade 6 are symmetric to each other with respect to the vertical axis of the wheel hub. Thereafter, the direction of the total bending moment load generated by the first blade 5 and the second blade 6 on wheel hub 4 will sharply change again from right to left. At this point, a severe vibration may easily occur, thereby causing damage to the components of the wind turbine.

When the wheel hub 4 rotates clockwise, driven by the rotor rotation control system, to state E ($\alpha$=240 degrees), the interface for installing the third blade 7 is just in the horizontal position, and at this point, the wheel hub 4 is locked so as to install the third blade 7 on the wheel hub 4. In this way, the three blades are installed on the wheel hub 4 along the circumferential direction of the wheel hub.

Based on the above analysis, in order to avoid the adverse effect of the sharp change of load on the wind turbine, bending moment loads generated by the blades in different states needs to be considered in the operation of the rotor rotation control system, to balance or resist the sharp change of the blade load.

Figure 5:
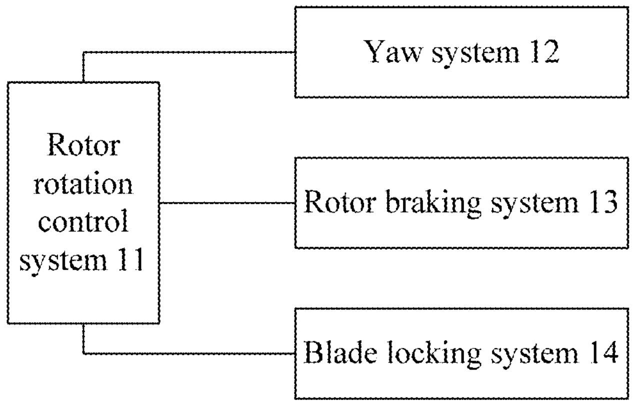
FIG. 5 is a topological diagram of a rotor rotation control system for a wind turbine according to an embodiment of the present disclosure.

FIG. 5 shows a topological diagram of a rotor rotation control system 11 for a wind turbine according to an embodiment of the present disclosure. The collaboration between the rotor rotation control system 11 and other operating systems during the blade installation is described below with reference to FIG. 5. The rotor rotation control system 11 is electrically connected to a yaw system 12, a rotor braking system 13 and a blade locking system 14 for communication.

Multiple yaw operations can be performed by the yaw system 12. A yaw control device is provided in the yaw system 12, and multiple control components such as a yaw enabling switch, a yaw residual pressure switch, a yaw stopping switch, a left yaw switch and a right yaw switch are provided in the yaw control device. The yaw enabling switch is configured to trigger a yaw enabling signal, the yaw residual pressure switch is configured to trigger a yaw residual pressure signal, the yaw stopping switch is configured to trigger a yaw stopping signal, the left yaw switch is configured to trigger a left yaw signal, and the right yaw switch is configured to trigger a right yaw signal. In response to the triggering of the yaw enabling signal, the yaw control device starts the yaw function. At the same time, a yaw motor is driven to work in response to the left yaw signal or right yaw signal triggered by the left yaw switch or the right yaw switch, to yaw the engine room of the wind turbine to a predetermined position. Then, the yaw stopping signal is triggered to stop the yaw motor, thereby stopping yawing.

The yaw system 12 further includes a yaw braking device for emergency braking. The yaw braking device can communicate with the yaw control device. A yaw braking operation can be carried out by the yaw braking device. In response to triggering the yaw residual pressure signal, the yaw braking device enables a brake to achieve yaw braking. The operation of the yaw system 12 can be fed back to the rotor rotation control system 11. For example, a pressure signal, a hydraulic oil level signal and a hydraulic valve group signal generated by a yaw hydraulic station in the yaw system 12 can be fed back to the rotor rotation control system 11. The rotor rotation control system 11 can display corresponding pressure parameters, hydraulic oil level parameters and whether the action of a hydraulic valve group is correct on a display unit. In addition, the rotor rotation control system 11 can determine whether an abnormal condition occurs. For example, if the oil level is below a set value, the rotor rotation control system 11 can alarm by using the display unit or a sound device.

The rotor braking system 13 can perform a rotor braking operation and stop a rotor braking operation. Before starting to drive the rotor of the wind turbine to rotate, the rotor rotation control system 11 can output a braking enabling signal and a braking disabling signal to the rotor braking system 13. The rotor braking system 13 can enable a brake connected to the generator end cover or the rotor on receiving the braking enabling signal to brake the rotor, thereby stopping the wheel hub connected to the rotor from rotating. The rotor braking system 13 can disable the brake connected to the generator end cover or the rotor on receiving the braking disabling signal to stop the rotor braking, thereby allowing the wheel hub fixed to the rotating shaft of the rotor to rotate. The operation of the rotor braking system 13 can be fed back to the rotor rotation control system 11. For example, a pressure signal, an oil level signal and an action signal of the hydraulic valve group in a hydraulic rotor braking circuit of the rotor brake system 13 can be fed back to the rotor rotation control system 11. The rotor rotation control system 11 can display corresponding pressure parameters, hydraulic oil level parameters and whether the action of the hydraulic valve group is correct on a display unit. In addition, rotor rotation control system 11 can determine whether an abnormal condition occurs. For example, if the oil level is below a set value, the rotor rotation control system 11 can alarm by using the display unit or a sound device.

The rotor rotation control system 11 can control the blade locking system 14 to perform a blade locking operation and a blade unlocking operation. For example, after a blade is installed, the rotor rotation control system 11 can control a hydraulic station for blade locking dowel in the blade locking system 14 to extend a blade locking dowel shaft to perform the blade locking operation. Before installing or removing a blade, the rotor rotation control system 11 can control the hydraulic station for blade locking dowel in the blade locking system 14 to retract the blade locking dowel shaft for blade installation or blade unlocking operation. A blade locking dowel sensor can detect whether a blade dowel shaft reaches a predetermined position, and feed a detection signal back to the rotor rotation control system 11, and the rotor rotation control system 11 can display an extension state and a retracting state of the blade dowel shaft.

In addition, a locking dowel is provided on a stator shaft of the generator, and a corresponding locking hole is provided on the rotor of the generator, that is, the locking dowel is fixed and the locking hole is rotatable. The rotor rotation control system 11 can also use a photoelectric sensor to detect an alignment position of the locking hole and the locking dowel. When determining, by using the photoelectric sensor, that the locking hole and the locking dowel are aligned with each other, the rotor rotation control system 11 controls the locking dowel to elongate into the locking hole to keep the wheel hub locked, where the strength of the locking dowel supports successive installation of three blades on the wheel hub.

Figure 6:
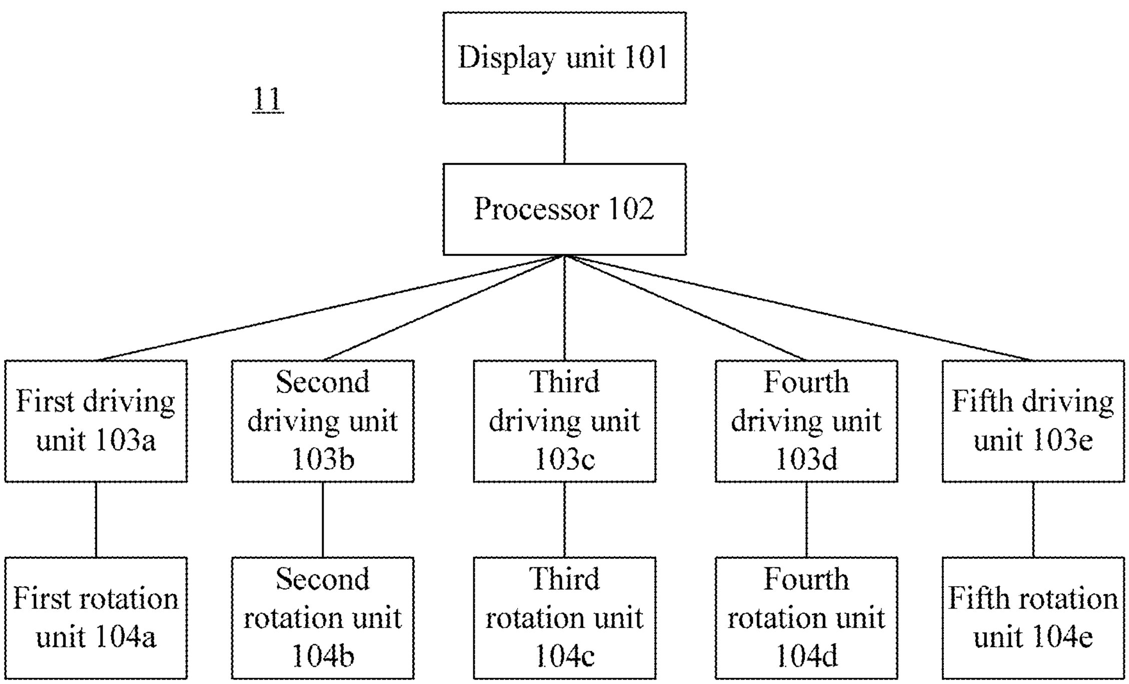
FIG. 6 is a structural block diagram of a rotor rotation control system according to an embodiment of the present disclosure.

FIG. 6 shows a structural block diagram of the rotor rotation control system 11 according to an embodiment of the present disclosure. The rotor rotation control system 11 includes a display unit 101 and a processor 102 which are interconnected, and the processor 102 can communicate with the display unit 101. The rotor rotation control system 11 further includes five driving units and five rotation units, where a first driving unit 103*a* is connected with a first rotation unit 104*a* to drive the first rotation unit 104*a*, a second driving unit 103*b* is connected with a second rotation unit 104*b* to drive the second rotation unit 104*b*, a third driving unit 103*c* is connected with a third rotation unit 104*c* to drive the third rotation unit 104*c*, a fourth driving unit 103*d* is connected with a fourth rotation unit 104*d* to drive the fourth rotation unit 104*d*, and a fifth driving unit 103*e* is connected with a fifth rotation unit 104*e* to drive the fifth rotation unit 104*e*. In this embodiment, each of the five rotation units includes a hydraulic cylinder, and accordingly, the five driving units are hydraulic driving units. The processor 102 is connected with the first driving unit 103*a*, the second driving unit 103*b*, the third driving unit 103*c*, the fourth driving unit 103*d* and the fifth driving unit 103*e*, and controls the operation of each driving unit to control the operation state thereof.

The operation of the rotor rotation control system 11 is described taking installation of three blades for example. First, before starting the blade installation, the yaw system 12 is controlled to yaw the engine room of the wind turbine to a predetermined position convenient for blade installation, and then the yaw is stopped. The yaw operation is no longer necessary during the blade installation. Then, the rotor rotation control system 11 outputs a braking disabling signal to the rotor braking system 13 to stop rotor braking, so that the wheel hub fixedly connected with the rotating shaft of the rotor can rotate. Besides, the rotor rotation control system 11 can further control the blade locking system 14 to retract the blade locking dowel shaft for easy installation of the blade. In this way, the rotor rotation control system 11 is ready the blade installation operation.

During the whole operation process, the processor 102 can collect operation parameters of the yaw system 12, the rotor braking system 13 and the blade locking system 14, determine whether an abnormal condition occurs based on the operation parameters, and send relevant information to the display unit 101, to use the display unit 101 to display operation states of the yaw system 12, the rotor braking system 13 and the blade locking system 14 or alarm based on an abnormal condition.

Referring again to FIG. 4, states B, C and D are critical states in which the bending moment load the blades exert on the wheel hub 4 sharply changes. The rotor rotation control system according to the present disclosure can change the operation states of the rotation units depending on the rotating position of the blades to balance or resist the change of the bending moment load of the blades. Specifically, the change of blade bending moment load can be pre-balanced by changing the operation states of the rotation units in advance, so as to realize the smooth transition of the overall load.

Hereby the description is made with state A defined as an initial state. The first blade 5 rotates clockwise driven by the rotor rotation control system after being installed. In an embodiment of the present disclosure, the five rotation units can drive the first blade 5 to rotate clockwise by about 7.5 degrees for each stroke in a clockwise direction. With state A as the starting point (0 stroke), it takes 12 strokes to reach state B, 16 strokes to reach state C, 20 strokes to reach state D, and 32 strokes to reach state E.

For the sake of brevity, FIG. 7 to FIG. 10 show only one driving unit and one rotation unit, and the operation of multiple driving units and multiple rotation units is described herein taking one driving unit and a corresponding rotation unit 104 for example. Herein, the rotation unit 104 represents the first rotation unit 104*a*, the second rotation unit 104*b*, the third rotation unit 104*c*, the fourth rotation unit 104*d*, and the fifth rotation unit 104*e*.

Figure 7:
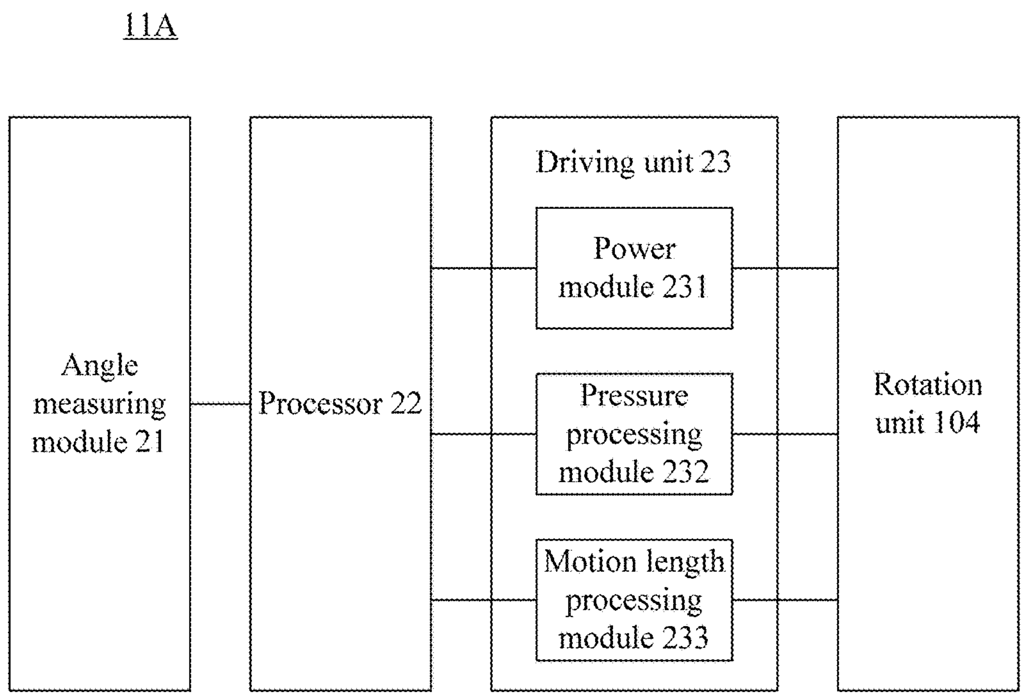
FIG. 7 is a structural block diagram of a rotor rotation control system according to an embodiment of the present disclosure.
Figure 8:
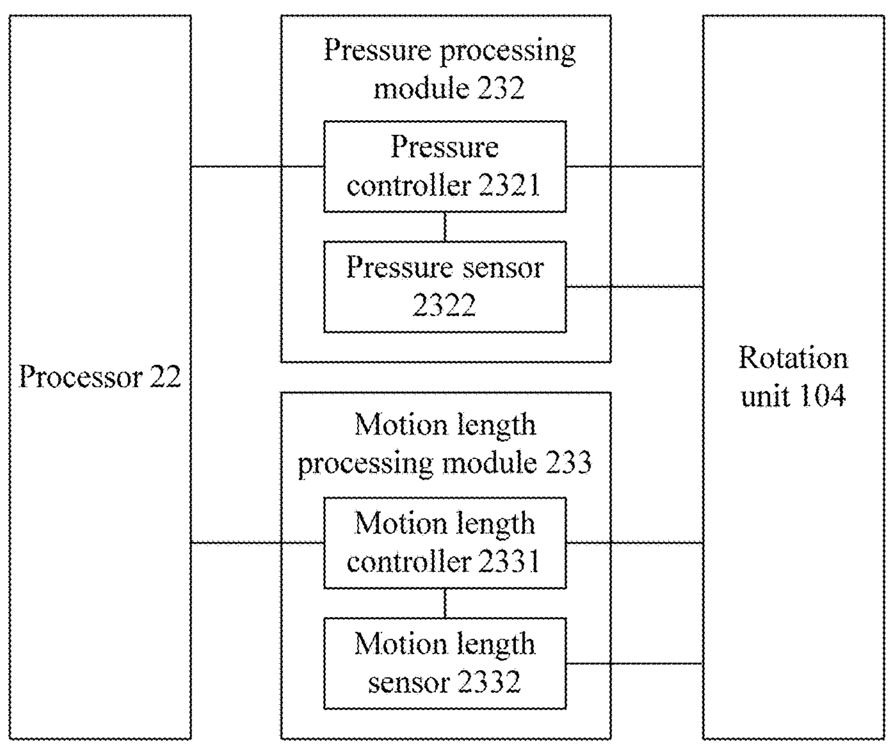
FIG. 8 is a partial structural block diagram of a rotor rotation control system according to an embodiment of the present disclosure.

FIG. 7 and FIG. 8 are structural block diagrams of a rotor rotation control system 11A according to an embodiment of the present disclosure. The rotor rotation control system 11A includes an angle measuring module 21, a processor 22, a driving unit 23, and the rotation unit 104. The processor 22 is connected between the angle measuring module 21 and the driving unit 23, and the driving unit 23 is also connected to the rotation unit 104. The angle measuring module 21 is configured to measure a rotation angle of the rotor and send the rotation angle as measured to the processor 22 for processing. The processor 22 determines a rotation angle of the wheel hub connected to the rotating shaft of the rotor based on the rotation angle of the rotor, and further determines a rotation angle of the first blade 5 installed on the wheel hub.

The driving unit 23 includes a power module 231, a pressure processing module 232, and a motion length processing module 233, all of which are connected to the processor 22 and the rotation unit 104. The power module 231 is configured to provide power to the rotation unit 104. In this embodiment, the power module 231 may be a hydraulic power module for providing hydraulic power to the hydraulic cylinder in the rotation unit 104.

As shown in FIG. 8, the pressure processing module 232 includes a pressure controller 2321 and a pressure sensor 2322 which are interconnected. The pressure controller 2321 and the pressure sensor 2322 are connected to the rotation unit 104. The pressure sensor 2322 is configured to measure a pressure of the hydraulic cylinder in the rotation unit 104 and send a measured pressure value to the pressure controller 2321. The pressure controller 2321 controls the pressure of the hydraulic cylinder in the rotation unit 104 based on the received pressure value.

The motion length processing module 233 includes a motion length controller 2331 and a motion length sensor 2332 which are interconnected. The motion length controller 2331 and the motion length sensor 2332 are connected to the rotation unit 104. The motion length sensor 2332 is configured to measure a motion length of the hydraulic cylinder in the rotation unit 104 and send a measured motion length value to the motion length controller 2331. The motion length controller 2331 controls the motion length of the hydraulic cylinder in the rotation unit 104 based on the received motion length value to control the rotation angle of the rotor or blades.

In an embodiment of the present disclosure, the processor 22 can determine a bending moment load switching position of a blade based on the rotation angle of the rotor, and adjust, by using the pressure controller 2321 and the pressure sensor 2322, a pressure of the rotation unit, that is, the pressure of the hydraulic cylinder in the rotation unit.

After installing the first blade 5, on determining that the first blade 5 rotates clockwise by 82.5 degrees based on the rotation angle obtained from the angle measuring module 21 ($\alpha$=82.5 degrees, after 11 strokes), the processor 22 sends a first adjustment instruction to the pressure controller 2321, such that during the $12^{th}$ stroke, the pressure controller 2321 increases the pressure in the rotation unit 104 by 5%. Thus, when rotating to the position of $\alpha$=82.5 degrees, there is still enough redundant pressure in each rotation unit 104 to resist the change of load even if the bending moment load of the blade sharply changes. It should be understood that the pressure adjustment coefficient of +5% is only illustrative, and other pressure adjustment coefficients can be set as needed in practical application. After the first blade 5 rotates to a position of $\alpha$=90 degrees, the processor 22 sends a second adjustment instruction to the pressure controller 2321 to restore the pressure coefficient in the rotation unit 104 to 1 (i.e., to the original value). By analogy, the processor 22 adjusts the pressure of the rotation unit based on the rotation angle of the rotor.

Table 1 below shows the pressure values of the first rotation unit 104*a*, the second rotation unit 104*b*, the third rotation unit 104*c*, the fourth rotation unit 104*d* and the fifth rotation unit 104*e* adjusted by the processor 22 depending on different ranges of a. F represents the pressure values of the rotation units that change with $\alpha$, and is associated with a bending moment load on a blade installed on the wheel hub. For example, in the process of rotating from state A to state B, FL=W*cos $\alpha$, where L represents a moment arm of a rotation unit relative to the wheel hub center and W represents a bending moment load of the first blade 5.

TABLE 1

| $\alpha$ | 104a | 104b | 104c | 104d | 104e |
|---|---|---|---|---|---|
| $0° \leq \alpha \leq 82.5°$ | F | F | F | F | F |
| $82.5° < \alpha \leq 90°$ | F (1 + 0.05) | F (1 + 0.05) | F (1 + 0.05) | F (1 + 0.05) | F (1 + 0.05) |
| $90° < \alpha \leq 112.5°$ | F | F | F | F | F |
| $112.5° < \alpha \leq 120°$ | F (1 + 0.05) | F (1 + 0.05) | F (1 + 0.05) | F (1 + 0.05) | F (1 + 0.05) |
| $120° < \alpha \leq 142.5°$ | F | F | F | F | F |
| $142.5° < \alpha \leq 150°$ | F (1 + 0.05) | F (1 + 0.05) | F (1 + 0.05) | F (1 + 0.05) | F (1 + 0.05) |
| $150° \leq \alpha \leq 240°$ | F. | F | F | F | F |

Figure 9:
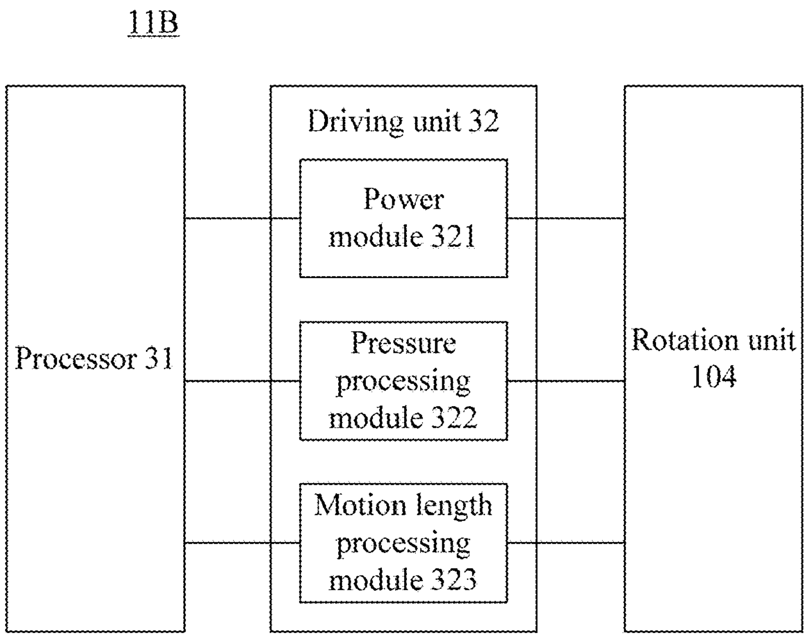
FIG. 9 is a structural block diagram of a rotor rotation control system according to an embodiment of the present disclosure.

FIG. 9 is a structural block diagram of a rotor rotation control system 11B according to another embodiment of the present disclosure. The rotor rotation control system 11B includes a processor 31, a driving unit 32 and a rotation unit 104. The driving unit 32 includes a power module 321, a pressure processing module 322 and a motion length processing module 323. The power module 321, the pressure processing module 322 and the motion length processing module 323 are connected to the processor 31 and the rotation unit 104. The power module 321 is similar to the power module 231 in structure and function. The pressure processing module 322 is similar to the pressure processing module 232 in structure and function. The motion length processing module 323 is similar to the motion length processing module 233 in structure and function.

In the embodiment illustrated in FIG. 9, the processor 31 can determine a bending moment load switching position of a blade based on a pressure value obtained from the pressure processing module 322, and send an adjustment instruction to the pressure processing module 322 to adjust a pressure of a rotation unit. The processor 31 stores in advance a pressure threshold of each rotation unit corresponding to a value of a. For example, the processor 31 stores in advance multiple pressure thresholds of each rotation unit corresponding to α=0 degrees, α=82.5 degrees, α=90 degrees, α=112.5 degrees, α=120 degrees, α=142.5 degrees, and α=150 degrees. Optionally, the pressure thresholds are thresholds of the sums or the averages of pressure values of all the rotation units corresponding to α=0 degrees, α=82.5 degrees, α=90 degrees, α=112.5 degrees, α=120 degrees, α=142.5 degrees, and α=150 degrees. α=82.5 degrees and α=90 degrees are associated with the bending moment load switching position of α=90 degrees, α=112.5 degrees and α=120 degrees are associated with the bending moment load switching position of α=120 degrees, and α=142.5 degrees and α=150 degrees are associated with the bending moment load switching position of α=150 degrees. When determining that the pressure value obtained from the pressure processing module 322 matches a pressure threshold stored in advance, the processor 31 determines a current value of abased on the pressure threshold, and then adjusts the pressure value of each rotation unit according to table 1.

Optionally, the processor 31 can also determine the bending moment load switching position of the blade based on a motion length value obtained from the motion length processing module 323, and send an adjustment instruction to the motion length processing module 323 to adjust the pressure of the rotation unit. In this embodiment, the processor 31 stores in advance a motion length threshold of each rotation unit corresponding to a value of a. For example, the processor 31 stores in advance multiple motion length thresholds of each rotation unit corresponding to α=0 degrees, α=82.5 degrees, α=90 degrees, α=112.5 degrees, α=120 degrees, α=142.5 degrees, and α=150 degrees. α=82.5 degrees and α=90 degrees are associated with the bending moment load switching position of α=90 degrees, α=112.5 degrees and α=120 degrees are associated with the bending moment load switching position of α=120 degrees, and α=142.5 degrees and α=150 degrees are associated with the bending moment load switching position of α=150 degrees. When determining that the motion length value obtained from the motion length processing module 322 matches a motion length threshold stored in advance, the processor 31 determines a current value of a based on the motion length threshold, and then adjusts the pressure value of each rotation unit according to table 1.

Figure 10:
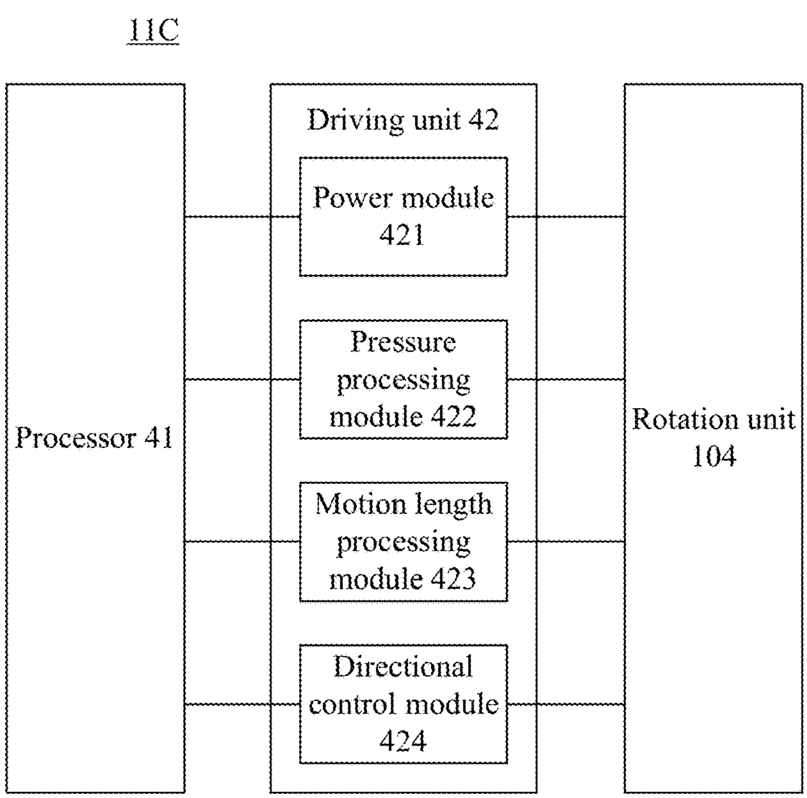
FIG. 10 is a structural block diagram of a rotor rotation control system according to an embodiment of the present disclosure.

FIG. 10 is a structural block diagram of a rotor rotation control system 11C according to another embodiment of the present disclosure. The rotor rotation control system 11C includes a processor 41, a driving unit 42 and a rotation unit 104. The rotor rotation control system 11C can adjust the operation state of each stroke of a telescoping cylinder in a rotation unit based on a bending moment load switching position of a blade, for example, changing the state of the telescoping cylinder in the rotation unit 104 from a thrust state to a pull state or from a pull state to a thrust state.

In an embodiment according to the present disclosure, the rotation unit 140 includes a telescoping cylinder, preferably a hydraulic cylinder. For a telescoping cylinder, the thrust state represents that the hydraulic cylinder generates thrust when the pressure in the cavity without a rod is greater than that in the cavity with a rod, and the pull state represents that the hydraulic cylinder generates pull when the pressure in the cavity without a rod is less than that in the cavity with a rod.

The switching between the thrust state and the pull state can be realized by a directional control module 424. As shown in FIG. 10, the directional control module 424 is arranged in the driving unit 42 and connected to the processor 41 and the rotation unit 104. The driving unit 42 further includes a power module 421, a pressure processing module 422 and a motion length processing module 423. The modules in the driving unit 42 are connected with the processor 41 and the rotation unit 104. The components in FIG. 10 except the directional control module 424 are similar to those of the embodiments in FIGS. 7 to 9 in structure and function.

Figure 11:
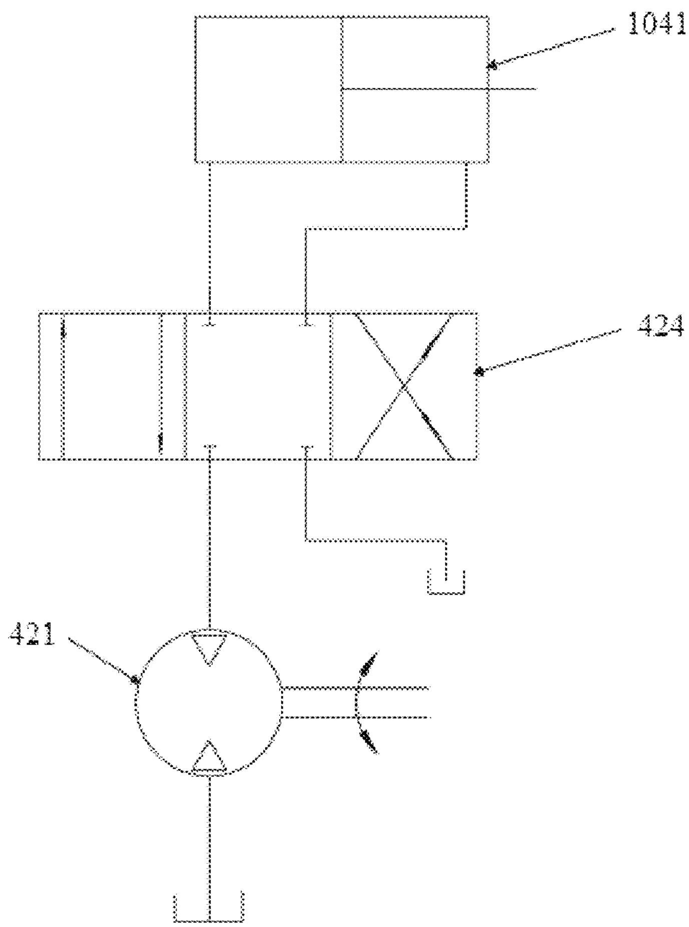
FIG. 11 is a schematic diagram of application of a directional control module according to an embodiment of the present disclosure.

FIG. 11 shows a schematic diagram of application of the directional control module 424 according to an embodiment of the present disclosure. The telescoping cylinder 1041 of the rotation unit 104 may be a hydraulic cylinder or an air cylinder. The directional control module 424 may be a three-position-four-way directional control valve, and the power module 421 may be a hydraulic pump or an air pump. The operating state of the telescoping cylinder 1041 can be adjusted by adjusting a valve position of the directional control module 424, for example, switching between the thrust state and the pull state.

In an embodiment in which the directional control module is provided, the processor of the rotor rotation control system can switch the operation states of each rotation unit by using directional control modules respectively connected with the first rotation unit 104*a*, the second rotation unit 104*b*, the third rotation unit 104*c*, the fourth rotation unit 104*d*, and the fifth rotation unit 104*e*. Description is made with reference to table 2 below for example, but the present disclosure is not limited thereto.

TABLE 2

| α | 104a | 104b | 104c | 104d | 104e |
|---|---|---|---|---|---|
| 0° ≤ α ≤ 82.5° | Thrust | Pull | Thrust | Thrust | Pull |
| 82.5° < α ≤ 90° | Thrust | Pull | Pull | Thrust | Pull |
| 90° < α ≤ 112.5° | Pull | Thrust | Pull | Pull | Thrust |
| 112.5° < α ≤ 120° | Pull | Thrust | Pull | Pull | Thrust |
| 120° < α ≤ 142.5° | Thrust | Pull | Thrust | Thrust | Pull |
| 142.5° < α 150° | Thrust | Pull | Pull | Thrust | Pull |
| 150° ≤ α ≤ 240° | Pull | Thrust | Pull | Pull | Thrust |

For example but not limited to, in the initial state A, the processor of the rotor rotation control system sets the first rotation unit 104*a*, the third rotation unit 104*c*, and the fourth rotation unit 104*d* to the thrust state, and the second rotation unit 104*b* and the fifth rotation unit 104*e* to the pull state.

On determining that α=82.5 degrees, the processor sends an adjustment instruction to the directional control module of the third rotation unit 104*c*, to switch the third rotation unit 104*c* from a thrust state to a pull state with the operation states of the other rotation units unchanged. The processor 41 can also send adjustment instructions to other rotation units to adjust the operation states of other rotation units based on the bending moment load switching position. Table 2 shows the operation state of each rotation unit corresponding to the value of a.

Tables 1 and 2 described above may be mapping tables stored in the processor or memory of the rotor rotation control system in advance. The operation states of each rotation unit of the above operation process can be displayed on a display unit connected with the processor.

Figure 12:
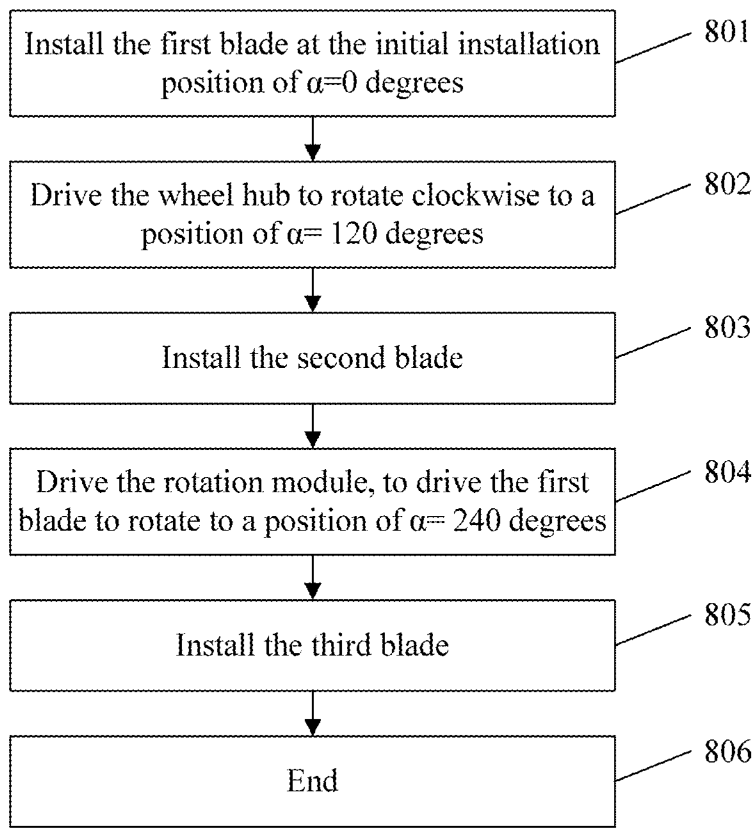
FIG. 12 is an operation flowchart of the sequential installation of three blades according to an embodiment of the present disclosure.

FIG. 12 shows an operation flowchart for sequentially installing three blades according to an embodiment of the present disclosure. Referring to FIG. 12, in step 801, the first blade is installed at an initial installation position where α=0 degrees (the interface for installing the first blade is in the horizontal position). In step 802, the wheel hub is driven to rotate clockwise to a position of α=120 degrees so that the interface for installing the second blade is in the horizontal position. In step 803, the second blade is installed. In step 804, the wheel hub is driven to rotate clockwise to a position of α=240 degrees so that the interface for installing the third blade is in the horizontal position. In step 805, the third blade is installed. Finally, the whole installation process is finished in step 806.

Figure 13:
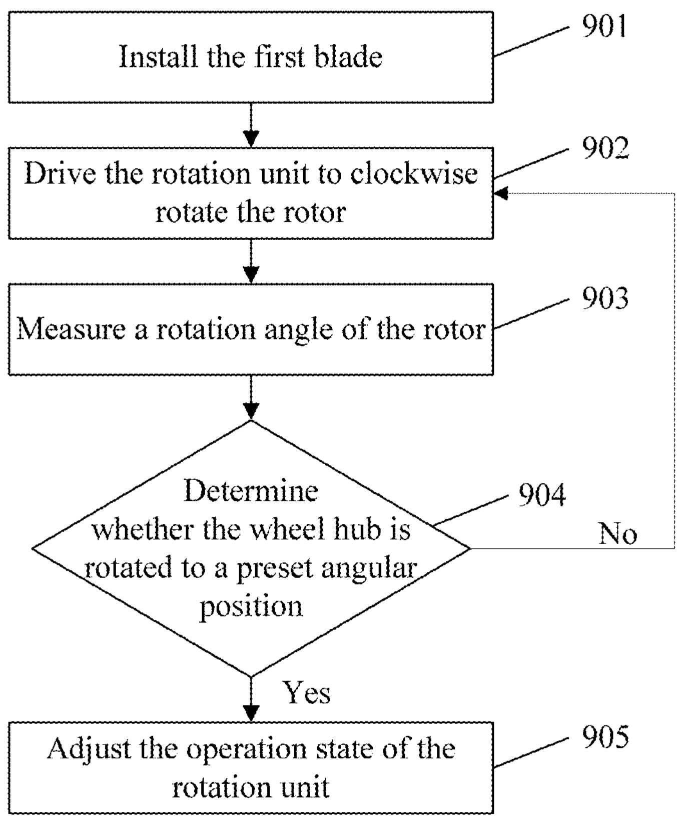
FIG. 13 is an operation flowchart of balancing the load change in the process of installing a blade according to an embodiment of the present disclosure.

FIG. 13 shows an operational flowchart of balancing load changes during blade installation according to an embodiment of the present disclosure. Referring to FIG. 13, in step 901, the first blade is installed. In step 902, the rotation unit is driven to move, to drive the rotor to rotate clockwise. In step 903, a rotation angle of the rotor is measured to determine a rotation angle of the wheel hub. In step 904, it is determined whether the wheel hub is rotated to a preset angular position, where the preset angular position is used for adjusting the operation state of the rotation unit to balance the change of bending moment load generated by the blade. In a case it is determined that the wheel hub rotates to the preset angular position, step 905 is performed to adjust the operation state of the rotation unit. In a case it is determined that the wheel hub does not yet rotate to the preset angular position, step 902 is repeated.

Installing three blades clockwise in sequence is described in the above embodiments, but the present disclosure is not limited thereto. In the rotor rotation control system and the control method according to the present disclosure, different adjustment instructions can be configured, depending on the specific requirements of rotor rotation direction, blade removal or blade maintenance during blade installation, for the processor of the rotor rotation control system to set different adjusting steps so as to balance the change of bending moment load at the bending moment load switching position. For example, in an embodiment of installing three blades in a counterclockwise direction, the adjusting process of the five rotation units is exactly reverse of that shown in Table 1.

According to the present disclosure, the rotor rotation control system for a wind turbine and the control method thereof can not only control the rotor rotation of the wind turbine, but also balance the load changes during the rotation process, so that the load caused by the blades or other components to the wind turbine can transit smoothly, effectively avoiding the severe vibration of the wind turbine and thereby reducing the damage to components of wind turbines. The rotor rotation control system and the control method are not only limited to wind turbines, but also apply to other mechanical equipment requiring balancing load switching.

A computer-readable storage medium including a computer program is provided according to an embodiment of the present disclosure, where the computer program can be run by a processor to perform the above-described rotor rotation control method for a wind turbine.

A computer is provided according to an embodiment of the present disclosure, which includes a memory configured to store instructions and a processor configured to execute the instructions stored in the memory to perform the above-described rotor rotation control method for a wind turbine.

Finally, it is to be noted that one of ordinary skilled in the art can understand all or part of the flow of the methods according to the above-described embodiments can be performed by hardware under the instruction of a computer program. The computer program may be stored in a computer-readable storage medium, and covers the flows of the methods according to the embodiments when being run. The storage medium may be a magnetic disk, an optical disk, a read-only storage memory (ROM) or a random storage memory (RAM).

The functional units in the embodiments according to the present disclosure may be integrated into a processing module or function as separate physical entities, or two or more of the functional units may be integrated into a module. The integrated modules may be implemented in the form of hardware or software functional module, and stored in a computer-readable storage medium in a case that they are implemented in the form of software functional module and sold or used as independent products. The computer-readable storage medium may be a read-only storage memory, a magnetic disk or an optical disk.

The implementations in the above embodiments can be further combined or replaced, and the preferred embodiments of the invention are only listed for purpose of description, rather than limitation on the concept and scope of the invention. Modifications and improvements made by one skilled in the art without deviating from the essence of the invention fall within the scope of the present disclosure.

The invention claimed is:

1. A rotor rotation control system for a wind turbine, comprising:

a rotation unit, configured to drive a rotor of the wind turbine to rotate relative to an engine base of the wind turbine;

a driving unit, configured to drive the rotation unit; and a processor, configured to determine a bending moment load switching position on a rotating shaft of the rotor, and output an adjustment instruction to the driving unit based on the bending moment load switching position, wherein, the driving unit receives the adjustment instruction from the processor and adjusts an operation state of the rotation unit in response to the adjustment instruction to balance a bending moment load change at the bending moment load switching position.

2. The rotor rotation control system according to claim 1, wherein, in the case that a blade is installed on a wheel hub connected with the rotor, the bending moment load switching position is associated with an installation position of the blade.

3. The rotor rotation control system according to claim 1, wherein, the processor is configured to determine the bending moment load switching position based on a rotation angle of the rotor.

4. The rotor rotation control system according to claim 3, further comprising: an angle measuring module configured to measure the rotation angle of the rotor.

5. The rotor rotation control system according to claim 1, wherein, the rotation unit comprises:

a telescoping cylinder;

an installation base, configured to connect a fixed end of the telescoping cylinder with the engine base, wherein the installation base is detachably connected with the engine base; and a dowel, arranged at a movable end of the telescoping cylinder, wherein the dowel is loosely fixed on the rotor and drives the rotor to rotate relative to the engine base through the stroke of the telescopic cylinder.

6. The rotor rotation control system according to claim 5, wherein, the driving unit further comprises a pressure processing module, and the pressure processing module comprises a pressure sensor and a pressure controller, wherein, the pressure sensor is configured to measure a pressure value of the telescoping cylinder and send the pressure value to the pressure controller, and the pressure controller is configured to control a pressure of the telescoping cylinder base on the pressure value obtained from the pressure sensor.

7. The rotor rotation control system according to claim 6, wherein, the pressure controller is further configured to send the pressure value to the processor, and the processor is further configured to determine the bending moment load switching position based on the pressure value as received.

8. The rotor rotation control system according to claim 7, wherein, the processor is further configured to:

store in advance a pressure threshold associated with the bending moment load switching position;

compare the pressure value as received with the pressure threshold; and output an adjustment instruction to the driving unit in a case that the pressure value matches the pressure threshold.

9. The rotor rotation control system according to claim 5, wherein, the driving unit further comprises a motion length processing module, and the motion length processing module comprises a motion length sensor and a motion length controller, wherein, the motion length sensor is configured to measure a motion length value of the telescoping cylinder and send the motion length value to the motion length controller, and the motion length controller is configured to control a motion length of the telescoping cylinder base on the motion length value obtained from the motion length sensor.

10. The rotor rotation control system according to claim 9, wherein, the length controller is further configured to send the motion length value to the processor, and the processor is further configured to determine the bending moment load switching position based on the motion length value as received.

11. The rotor rotation control system according to claim 10, wherein, the processor is further configured to:

store in advance a motion length threshold associated with the bending moment load switching position;

compare the motion length value as received with the motion length threshold; and output an adjustment instruction to the driving unit in a case that the motion length value matches the motion length threshold.

12. A rotor rotation control method for a wind turbine, comprising:

a driving step of driving a rotation unit to drive a rotor connected with the rotation unit to rotate relative to an engine base of the wind turbine; and an adjustment step of determining a bending moment load switching position on a rotating shaft of the rotor, and adjusting an operation state of the rotation unit based on the bending moment load switching position to balance a bending moment load change at the bending moment load switching position.

13. The rotor rotation control method according to claim 12, wherein, in a case of installing a plurality of blades on a wheel hub connected with the rotor, the bending moment load switching position is associated with installation positions of the plurality of blades.

14. The rotor rotation control method according to claim 12, wherein, the rotor rotation control method further comprises: measuring a rotation angle of the rotor, and the adjustment step comprises: determining the bending moment load switching position based on the rotation angle of the rotor.

15. The rotor rotation control method according to claim 12, further comprising:

measuring a pressure value of a telescoping cylinder of the rotation unit; and controlling a pressure of the telescoping cylinder based on the pressure value.

16. The rotor rotation control method according to claim 15, wherein, the adjustment step comprises: determining the bending moment load switching position based on the pressure value.

17. The rotor rotation control method according to claim 16, wherein, the rotor rotation control method further comprises: storing in advance a pressure threshold associated with the bending moment load switching position, and the adjustment step comprises:

comparing the pressure value with the pressure threshold; and adjusting the operation state of the rotation unit in a case that the pressure value matches the pressure threshold.

18. The rotor rotation control method according to claim 12, further comprising:

measuring a motion length value of a telescoping cylinder of the rotation unit; and controlling a motion length of the telescoping cylinder based on the motion length value.

19. The rotor rotation control method according to claim 18, wherein, the adjustment step further comprises: determining the bending moment load switching position based on the motion length value.

20. The rotor rotation control method according to claim 19, wherein, the rotor rotation control method further comprises: storing in advance a motion length threshold associated with the bending moment load switching position, and the adjustment step comprises:

comparing the motion length value with the motion length threshold; and adjusting the operation state of the rotation unit in a case that the motion length value matches the motion length threshold.

21. A computer-readable storage medium, wherein a computer program is stored on the computer-readable storage medium and performs the method according to claim 12 when being run by a processor.

22. A computer, comprising:

a memory, configured to store instructions; and a processor, configured to execute the instructions stored in the memory to perform the method according to claim 12.

* * * * *